(12) United States Patent
Hong et al.

(10) Patent No.: US 9,574,652 B2
(45) Date of Patent: Feb. 21, 2017

(54) DRIVING DEVICE USED IN A PAPER SEPARATION MECHANISM

(71) Applicant: Foxlink Image Technology Co., Ltd., New Taipei (TW)

(72) Inventors: I Chuan Hong, New Taipei (TW); Lung Chen, New Taipei (TW); Wen Ching Liao, New Taipei (TW); Shih Chao Kao, New Taipei (TW); Jing Hua Fang, New Taipei (TW); Ming Wei Lin, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 289 days.

(21) Appl. No.: 14/595,552

(22) Filed: Jan. 13, 2015

(65) Prior Publication Data

US 2016/0201741 A1    Jul. 14, 2016

(51) Int. Cl.
*F16D 43/20* (2006.01)
*F16H 55/17* (2006.01)
*F16D 41/22* (2006.01)
*F16D 43/202* (2006.01)

(52) U.S. Cl.
CPC .............. *F16H 55/17* (2013.01); *F16D 41/22* (2013.01); *F16D 43/2026* (2013.01)

(58) Field of Classification Search
CPC ...... F16H 55/17; F16D 41/22; F16D 43/2026; F16D 43/2024; F16D 43/2028
See application file for complete search history.

(56) References Cited

U.S. PATENT DOCUMENTS

| 5,497,986 | A  | * | 3/1996 | Kudo | B65H 3/5261 |
|||||| 271/110 |
| 5,873,441 | A | * | 2/1999 | Tsujishita | F16D 41/22 |
|||||| 192/46 |
| 2014/0140745 | A1 | * | 5/2014 | Choi | F16D 41/22 |
|||||| 399/381 |
| 2015/0027841 | A1 | * | 1/2015 | Kainuma | F16D 7/044 |
|||||| 192/69 |

* cited by examiner

*Primary Examiner* — Stacey Fluhart
(74) *Attorney, Agent, or Firm* — WPAT, P.C., Intellectual Property Attorneys; Anthony King

(57) ABSTRACT

A driving device used in a paper separation mechanism includes an internal gear, an external gear sheathed around the internal gear, a shell of which an inner front face protrudes backward to form a hollow cylinder which the internal gear is sheathed around, an elastic element restrained between a front end of the internal gear and the inner front face of the shell, and a driving member rotatably on the rear of the shell. The driving device utilizes the cooperation of a guide block of the internal gear and a guide groove of spiral shape of the hollow cylinder, the cooperation of a locking arm of the shell and an outer ratchet of the external gear, the cooperation of a slope of the external gear and pushing blocks of the driving member to make a clockwise rotation angle of the driving member be greater than a counterclockwise rotation angle.

7 Claims, 7 Drawing Sheets

DRIVING DEVICE USED IN A PAPER SEPARATION MECHANISM

BACKGROUND OF THE INVENTION

1. Field of the Invention

The present invention relates to a driving device, and more particularly to a driving device used in a paper separation mechanism.

2. The Related Art

Along with the development of modern information technology, printers are used more and more frequently in daily office work. Paper separation mechanisms of the printers are divided into two types according to their work principles. One type of paper separation mechanism realizes a paper separation process by a friction sheet, wherein it further includes a spring, and the friction sheet realizes the paper separation process by virtue of a positive pressure from the spring. The other type of paper separation mechanism realizes a paper separation process by a torque limiter and paper separation rollers.

However, the one type of paper separation mechanism is easily worn on account of high friction of the friction sheet, furthermore the faster the paper is transmitted, the greater the mechanical wear is, so the one type of paper separation mechanism has disadvantages of high mechanical wear and short service life. Since the torque limiter of the other type of paper separation mechanism can share a part of the mechanical wear, the other type of paper separation mechanism has a longer service life than the one type of paper separation mechanism, and is widely used in the printers, but some mechanical wear still remains in the other type of paper separation mechanism.

SUMMARY OF THE INVENTION

Accordingly, an object of the present invention is to provide a driving device used in a paper separation mechanism. The driving device includes an internal gear of cylindric shape. An inner sidewall of the internal gear protrudes inward to form a guide block. A plurality of rear meshing teeth is protruded in the rear of the internal gear. An external gear of cylindric shape is sheathed around the internal gear. The external gear has an outer ratchet around an outside surface of the external gear and a front ratchet protruded in the front of the external gear. A rear edge of the external gear protrudes backward to form a plurality of resist blocks which are spaced from one another to form a plurality of activity grooves each between every two adjacent ones of the resist blocks. One sidewall of each of the resist blocks is designed with a slope. Another side wall of each of the resist blocks is a vertical resist surface. A driving member has a substrate. A front face of the substrate protrudes forward to form a plurality of front meshing teeth corresponding to the rear meshing teeth of the internal gear. The front face of the substrate protrudes forward to form a plurality of pushing blocks which are separately arranged around the front meshing teeth and corresponding to the activity grooves of the external gear. A shell of cylindric shape has an inner front face protrude backward to form a hollow cylinder. An outside surface of the hollow cylinder defines a guide groove of spiral shape. The inner front face of the shell further protrudes backward to form a rear ratchet arranged around the hollow cylinder in the shell and corresponding to the front ratchet of the external gear. A hole is opened through an outer wall of the shell. One side edge of the hole extends towards the other side edge of the hole to form a locking arm. The outer surface curvature of the locking arm is same with that of the outer wall of shell. The free end of the locking arm projects into the shell. The driving device further includes an elastic element. Wherein the internal gear is sheathed around the hollow cylinder, and the guide block is slidably located in the guide groove to guide the internal gear and the external gear to rotate and move back and forth in the shell. The free end of the locking arm resists against the outer ratchet of the external gear to stop the external gear rotating counterclockwise. The elastic element is wound around the hollow cylinder and restrained between a front end of the internal gear and the inner front face of the shell. The driving member is rotatably mounted on the rear of the shell, the pushing blocks of the driving member are contained in the activity grooves of the external gear respectively and the rear meshing teeth of the internal gear mesh with the front meshing teeth of the driving member.

In use, the paper separation mechanism drives the driving member to rotate counterclockwise. Each of the pushing blocks of the driving member slides along the slope of the external gear to push the external gear together with the internal gear to move forward. The guide block of the internal gear slides in the guide groove of the hollow cylinder to guide the internal gear to counterclockwise rotate and further move forward to press the elastic element, until the front ratchet of the external gear meshes with the rear ratchet of the shell. At this point a counterclockwise rotation angle of the driving member is directly proportional to the length of the slope of the external gear. Then the elastic element releases the elastic potential energy to push the internal gear together with the external gear to clockwise rotate under the cooperation of the guide block and the guide groove and further move backward. The slope of the external gear pushes the pushing blocks of the driving member to make the driving member rotate clockwise, until the rear meshing teeth of the internal gear mesh with the front meshing teeth of the driving member. At this point a clockwise rotation angle of the driving member is directly proportional to the sum of the length of the slope and the length of the guide groove, so the clockwise rotation angle of the driving member is greater than the counterclockwise rotation angle.

As described above, the driving device of the present invention utilizes the cooperation of the guide block and the guide groove of spiral shape, the cooperation of the locking arm of the shell and the outer ratchet of the external gear, and the cooperation of the slope of the external gear and the pushing blocks of the driving member, to make the clockwise rotation angle of the driving member be greater than the counterclockwise rotation angle. So after a paper separation action is completed by the paper separation mechanism, the driving device drives the paper separation mechanism to clockwise rotate at an angle and stay in a different position, so that effectively prolongs the service life of the paper separation mechanism.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
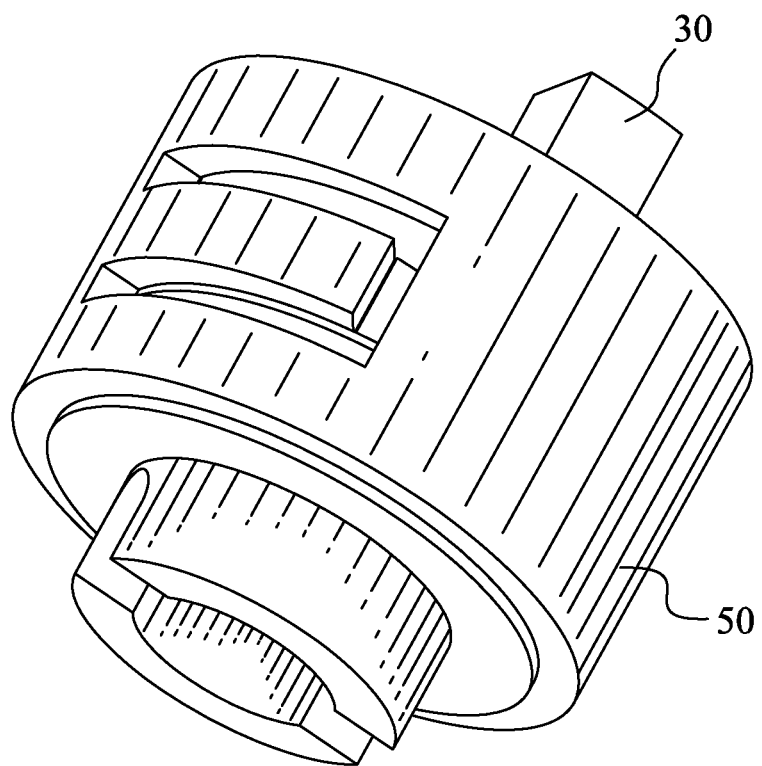
FIG. 1 is a perspective view of a driving device used in a paper separation mechanism according to an embodiment of the present invention.
Figure 2:
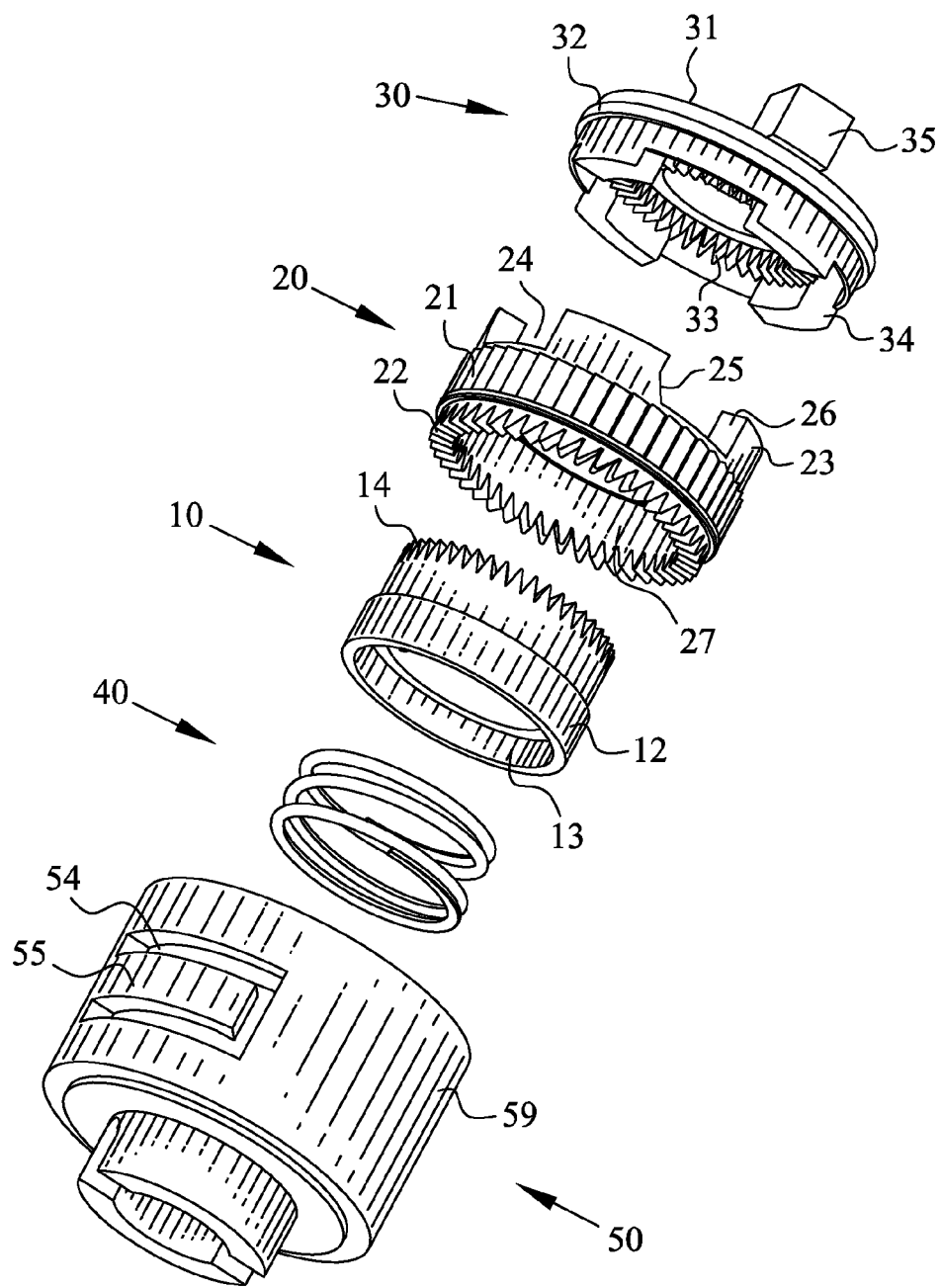
FIG. 2 is an exploded view of the driving device of FIG. 1.

With reference to FIG. 1 and FIG. 2, an embodiment of the invention is embodied in a driving device used in a paper separation mechanism (not shown). The driving device includes an internal gear 10 of cylindric shape, an external gear 20 of cylindric shape, a driving member 30, an elastic element 40 and a shell 50 of cylindric shape.

Figure 3:
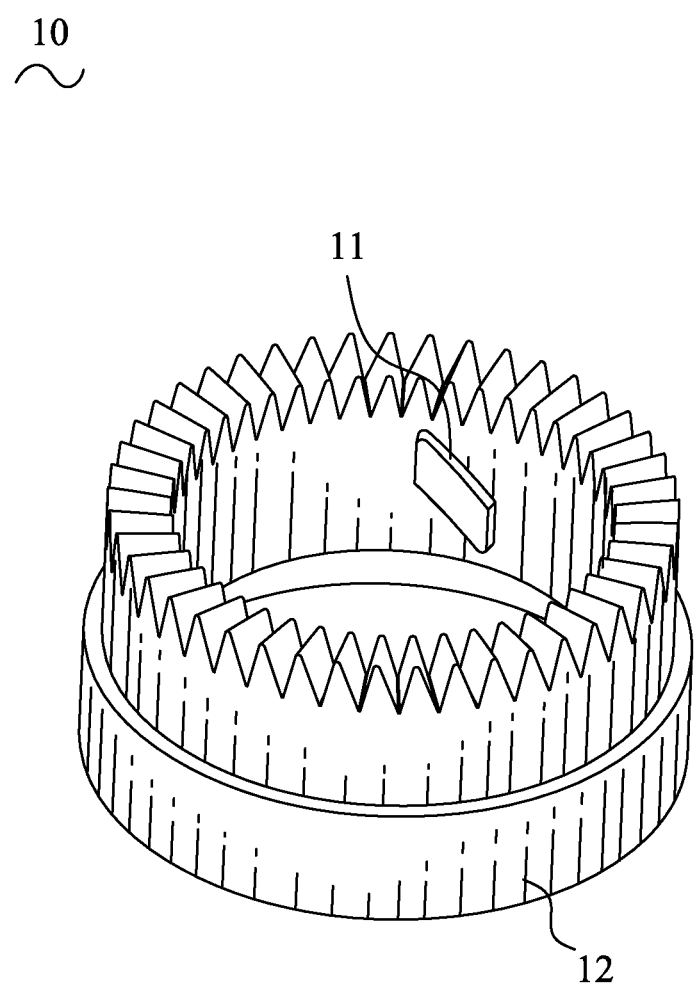
FIG. 3 is a perspective view of an internal gear of the driving device of FIG. 1.

Referring to FIG. 2 and FIG. 3, an inner sidewall of the internal gear 10 protrudes inward to form a guide block 11. A front end of the internal gear 10 protrudes outward to form a circular fastening portion 12. An inner sidewall of the fastening portion 12 defines a holding groove 13. A plurality of rear meshing teeth 14 are protruded in the rear of the internal gear 10.

Referring to FIG. 2, the external gear 20 is sheathed around the internal gear 10. The external gear 20 has an outer ratchet 21 around an outside surface of the external gear 20 and a front ratchet 22 protruded in the front of the external gear 20. A rear edge of the external gear 20 protrudes backward to form a plurality of resist blocks 23 which are spaced from one another to form a plurality of activity grooves 24 each between every two adjacent ones of the resist blocks 23. One side wall of each of the resist blocks 23 is designed with a slope 25, and another side wall of each of the resist blocks 23 is a vertical resist surface 26. A front end of an inner sidewall of the external gear 20 defines a holding fillister 27 corresponding to the fastening portion 12 of the internal gear 10. The internal gear 10 is mounted in the external gear 20 along the front-to-back direction. The fastening portion 12 of the internal gear 10 is held in the holding fillister 27 of the external gear 20.

Referring to FIG. 2, the driving member 30 has a substrate 31. A ring-shaped buckling rib 32 is protruded around an outside face of the substrate 31. A front face of the substrate 31 protrudes forward to form a front meshing teeth 33 corresponding to the rear meshing teeth 14 of the internal gear 10. The front face of the substrate 31 protrudes forward to form a plurality of pushing blocks 34 which are separately arranged around the front meshing teeth 33 and corresponding to the activity grooves 24 of the external gear 20. In this embodiment of the invention, a back face of the substrate 31 protrudes backward to form a plurality of mounting blocks 35 mounted to the paper separation mechanism.

Figure 4:
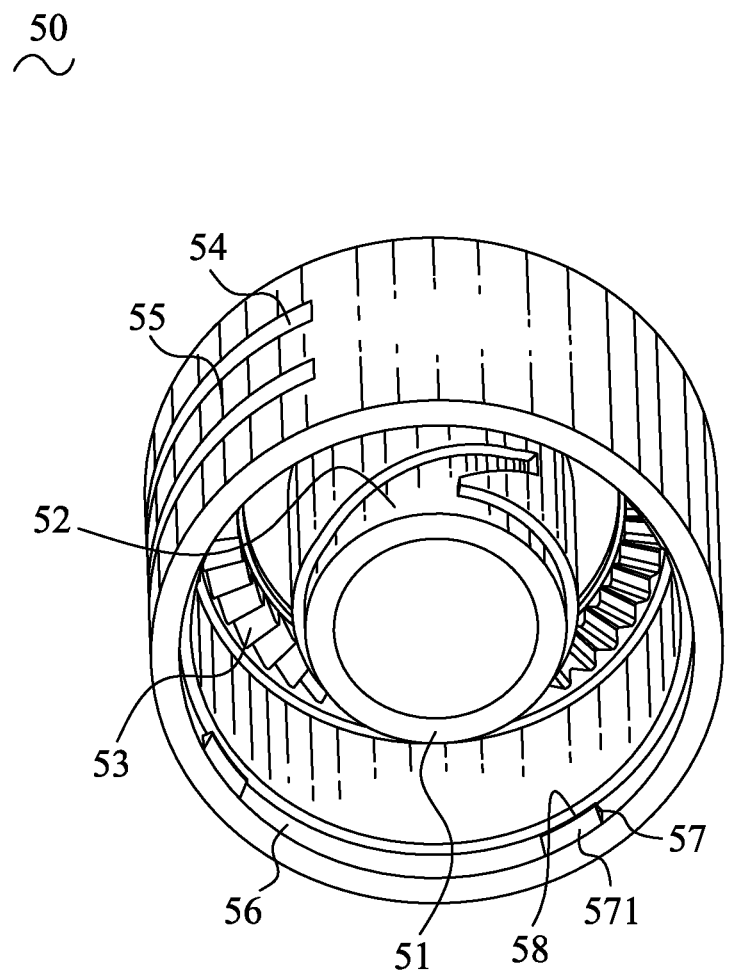
FIG. 4 is a perspective view of a shell of the driving device of FIG. 1.
Figure 5:
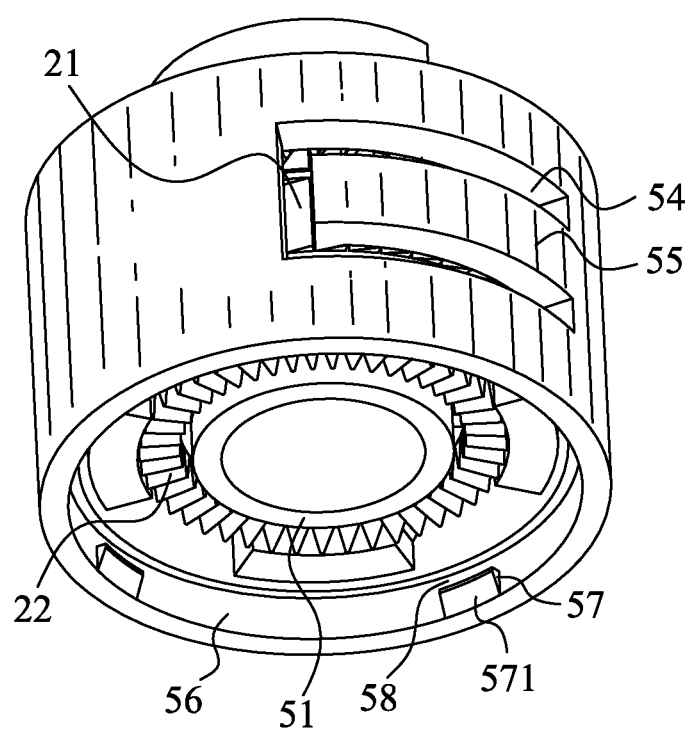
FIG. 5 is another perspective view of the driving device without a driving member of FIG. 1.
Figure 6:
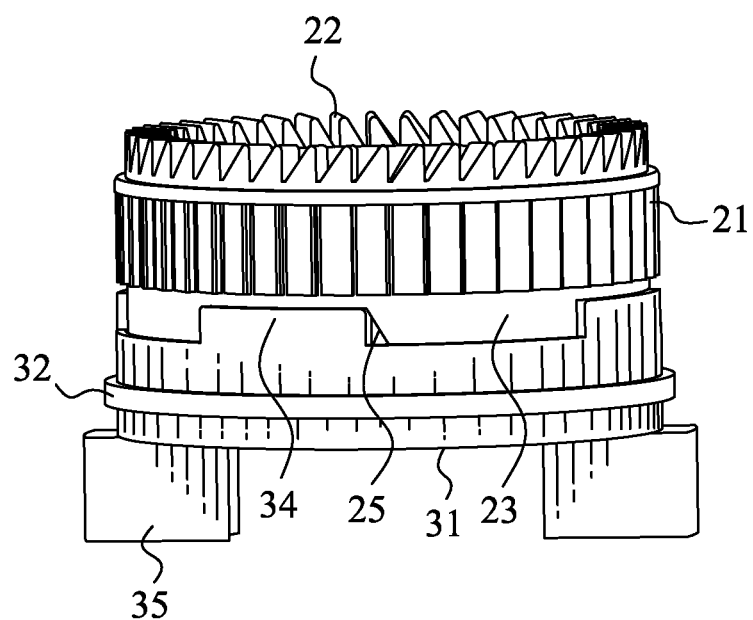
FIG. 6 is another perspective view of the driving device without the shell of FIG. 1.
Figure 7:
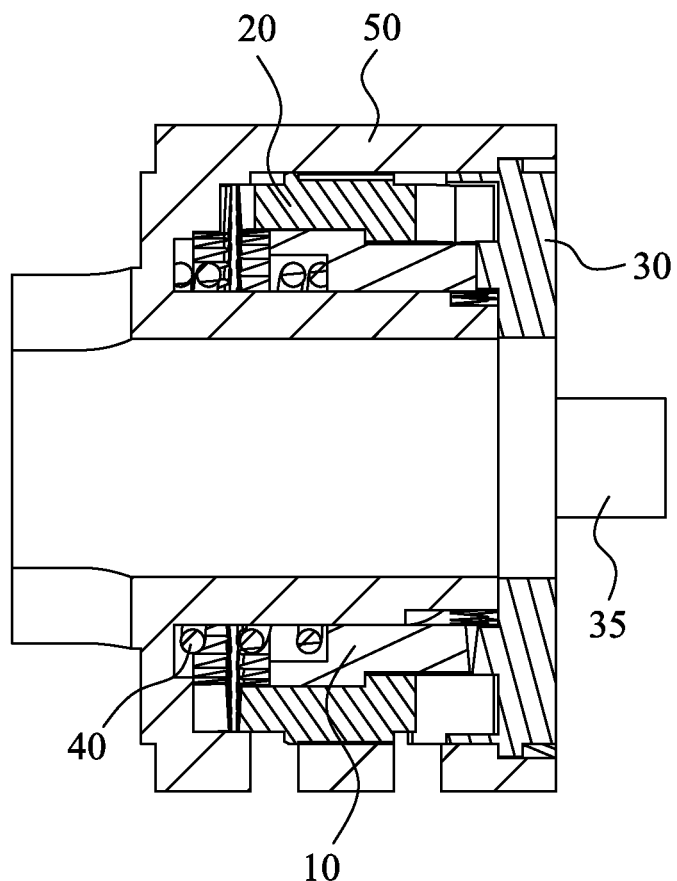
FIG. 7 is a cross-sectional view of the driving device of FIG. 1.

Referring to FIG. 2, FIG. 4 and FIG. 5, an inner front face of the shell 50 protrudes backward to form a hollow cylinder 51. An outside surface of the hollow cylinder 51 defines a guide groove 52 of spiral shape corresponding to the guide block 11 of the internal gear 10. The inner front face of the shell 50 further protrudes backward to form a rear ratchet 53 arranged around the hollow cylinder 51 in the shell 50 and corresponding to the front ratchet 22 of the external gear 20. A hole 54 is opened through an outer wall 59 of the shell 50. One side edge of the hole 54 extends towards the other side edge of the hole 54 to form a locking arm 55. The outer surface curvature of the locking arm 55 is same with that of the outer wall 59 of shell 50. The free end of the locking arm 55 is projected into the shell 50. A rear of an inner surface of the outer wall 59 of the shell 50 defines a mounting groove 56. A groove wall of the mounting groove 56 protrudes inward to form a plurality of buckling blocks 57 which are spaced from a front sidewall of the mounting groove 56 to form a buckling groove 58 between the buckling blocks 57 and the front sidewall of the mounting groove 56.

Referring to FIG. 1 to FIG. 7, the shell 50 is sheathed around the internal gear 10, the external gear 20, the driving member 30 and the elastic element 40. The internal gear 10 is sheathed around the hollow cylinder 51 of the shell 50, and the guide block 11 of the internal gear 10 is slidably located in the guide groove 52 to guide the internal gear 10 and the external gear 20 to rotate and move back and forth in the shell 50. The free end of the locking arm 55 resists against the outer ratchet 21 of the external gear 20 to stop the external gear 20 rotating counterclockwise. The elastic element 40 is wound around the hollow cylinder 51 and restrained between the front end of the internal gear 10 and the inner front face of the shell 50. In detail, a rear end of the elastic element 40 is held in the holding groove 13 and resists against a rear groove wall of the holding groove 13 of the internal gear 10. The driving member 30 is rotatably mounted on the rear of the shell 50. The buckling rib 32 of the driving member 30 is movably positioned in the buckling groove 58 of the shell 50 and can guide the rotation of the driving member 30. The pushing blocks 34 of the driving member 30 are contained in the activity grooves 24 of the external gear 20 respectively and the rear meshing teeth 14 of the internal gear 10 mesh with the front meshing teeth 33 of the driving member 30. In this embodiment of the invention, a rear of each of the buckling blocks 57 is designed with a guide incline 571 for guiding the assembly of the buckling rib 32 and the buckling groove 58.

When the paper separation mechanism drives the driving member 30 to rotate counterclockwise, each of the pushing blocks 34 of the driving member 30 slides along the slope 25 of the external gear 20 to push the external gear 20 together with the internal gear 10 to move forward. The guide block 11 of the internal gear 10 slides in the guide groove 52 of the hollow cylinder 51 to guide the internal gear 10 to counterclockwise rotate and further move forward to press the elastic element 40. Because the free end of the locking arm 55 resists against the outer ratchet 21 of the external gear 20, the external gear 20 just moves forward. In the initial state, the rear meshing teeth 14 of the internal gear 10 mesh with the front meshing teeth 33 of the driving member 30. Because the width of the guide groove 52 is larger than that of the guide block 11, in the beginning the internal gear 10 and the external gear 20 just move forward without rotating to make the rear meshing teeth 14 of the internal gear 10 gradually get away from the front meshing teeth 33 of the driving member 30. Then the external gear 20 continues driving the internal gear 10 forward to further realize a counterclockwise rotation of the internal gear 10 under the cooperation of the guide block 11 and the guide groove 52, until the front ratchet 22 of the external gear 20 meshes with the rear ratchet 53 of the shell 50. At this point a counterclockwise rotation angle of the driving member 30 is directly proportional to the length of the slope 25 of the external gear 20.

The paper separation mechanism stops driving the driving member 30 to counterclockwise rotate, when the paper separation mechanism completes a paper separation process.

Then the elastic element 40 releases the elastic potential energy to push the internal gear 10 together with the external gear 20 to clockwise rotate under the cooperation of the guide block 11 and the guide groove 52 and further move backward. At this time, the rotary power of the internal gear 10 is provided by the guide groove 52. When the internal gear 10 together with the external gear 20 just move backward without rotating, the slope 25 of the external gear 20 pushes the pushing blocks 34 of the driving member 30 to further make the driving member 30 rotate clockwise, until the rear meshing teeth 14 of the internal gear 10 mesh with the front meshing teeth 33 of the driving member 30. At this point a clockwise rotation angle of the driving member 30 is directly proportional to the sum of the length of the slope 25 and the length of the guide groove 52. So the clockwise rotation angle of the driving member 30 is greater than the counterclockwise rotation angle, and the driving device drives the paper separation mechanism to clockwise rotate at an angle and stay in a different position after a paper separation action is completed by the paper separation mechanism.

In this embodiment of the invention, the elastic element 40 is a spring.

As described above, the driving device of the present invention utilizes the cooperation of the guide block 11 and the guide groove 52 of spiral shape, the cooperation of the locking arm 55 of the shell 50 and the outer ratchet 21 of the external gear 20, and the cooperation of the slope 25 of the external gear 20 and the pushing blocks 34 of the driving member 30, to make the clockwise rotation angle of the driving member 30 be greater than the counterclockwise rotation angle. So after a paper separation action is completed by the paper separation mechanism, the driving device drives the paper separation mechanism to clockwise rotate at an angle and stay in a different position, so that effectively prolongs the service life of the paper separation mechanism.

What is claimed is:

1. A driving device used in a paper separation mechanism, comprising:

an internal gear of cylindric shape, an inner sidewall of the internal gear protruding inward to form a guide block, a plurality of rear meshing teeth being protruded in a rear of the internal gear;

an external gear of cylindric shape sheathed around the internal gear, the external gear having an outer ratchet around an outside surface of the external gear and a front ratchet protruded in a front of the external gear, a rear edge of the external gear protruding backward to form a plurality of resist blocks which are spaced from one another to form a plurality of activity grooves each between every two adjacent ones of the resist blocks, one sidewall of each of the resist blocks being designed with a slope, another side wall of each of the resist blocks being a vertical resist surface;

a driving member having a substrate, a front face of the substrate protruding forward to form a plurality of front meshing teeth corresponding to the rear meshing teeth of the internal gear, the front face of the substrate protruding forward to form a plurality of pushing blocks which are arranged separately and around the front meshing teeth and corresponding to the activity grooves of the external gear;

a shell of cylindric shape, an inner front face of the shell protruding backward to form a hollow cylinder, an outside surface of the hollow cylinder defining a guide groove of a spiral shape, the inner front face of the shell further protruding backward to form a rear ratchet arranged around the hollow cylinder in the shell and corresponding to the front ratchet of the external gear, a hole being opened through an outer wall of the shell, one side edge of the hole extending towards the other side edge of the hole to form a locking arm, a curvature of an outer surface of the locking arm being the same as a curvature of an outer surface of the outer wall of the shell, a free end of the locking arm projecting into the shell; and an elastic element;

wherein the internal gear is sheathed around the hollow cylinder, the guide block is slidably located in the guide groove to guide the internal gear and the external gear to rotate and move back and forth in the shell, the free end of the locking arm resists against the outer ratchet of the external gear to stop the external gear from rotating counterclockwise, the elastic element is wound around the hollow cylinder and restrained between a front end of the internal gear and the inner front face of the shell, the driving member is rotatably mounted on a rear of the shell, the pushing blocks of the driving member are contained in the activity grooves of the external gear respectively and the rear meshing teeth of the internal gear mesh with the front meshing teeth of the driving member;

wherein in use, the paper separation mechanism drives the driving member to rotate counterclockwise, each of the pushing blocks of the driving member slides along the slope of the external gear to push the external gear together with the internal gear to move forward, the guide block of the internal gear slides in the guide groove of the hollow cylinder to guide the internal gear to counterclockwise rotate and further move forward to press the elastic element, until the front ratchet of the external gear meshes with the rear ratchet of the shell, at this point a counterclockwise rotation angle of the driving member is directly proportional to a length of the slope of the external gear; then the elastic element releases an elastic potential energy to push the internal gear together with the external gear to clockwise rotate under the cooperation of the guide block and the guide groove and further move backward, the slope of the external gear pushes the pushing blocks of the driving member to make the driving member rotate clockwise, until the rear meshing teeth of the internal gear mesh with the front meshing teeth of the driving member, at this point a clockwise rotation angle of the driving member is directly proportional to a sum of the length of the slope and a length of the guide groove, so the clockwise rotation angle of the driving member is greater than the counterclockwise rotation angle.

2. The driving device as claimed in claim 1, wherein a rear of an inner surface of the outer wall of the shell defines a mounting groove, a groove wall of the mounting groove protrudes inward to form a plurality of buckling blocks which are spaced from a front sidewall of the mounting groove to form a buckling groove between the buckling blocks and the front sidewall of the mounting groove, a ring-shaped buckling rib is protruded around an outside face of the substrate, the buckling rib of the driving member is movably positioned in the buckling groove of the shell and can guide the rotation of the driving member.

3. The driving device as claimed in claim 2, wherein a rear of each of the buckling blocks is designed with a guide incline which guides an assembly of the buckling rib and the buckling groove.

4. The driving device as claimed in claim 1, wherein the front end of the internal gear protrudes outward to form a circular fastening portion, an inner sidewall of the fastening portion defines a holding groove, a rear end of the elastic element is held in the holding groove and resists against a rear groove wall of the holding groove of the internal gear.

5. The driving device as claimed in claim 4, wherein a front end of an inner sidewall of the external gear defines a holding fillister groove corresponding to the fastening portion of the internal gear, the fastening portion of the internal gear is held in the holding fillister groove of the external gear.

6. The driving device as claimed in claim 1, wherein a back face of the substrate protrudes backward to form a plurality of mounting blocks mounted to the paper separation mechanism.

7. The driving device as claimed in claim 1, wherein the elastic element is a spring.

* * * * *